UNITED STATES PATENT OFFICE.

GEORGE G. McMURTRY, OF NEW YORK, N. Y., ASSIGNOR TO UNITED STATES STEEL CORPORATION, OF HOBOKEN, NEW JERSEY, A CORPORATION OF NEW JERSEY.

STEEL-MAKING PROCESS.

1,217,972.  Specification of Letters Patent.  Patented Mar. 6, 1917.

No Drawing.   Application filed January 27, 1915.  Serial No. 4,578.

*To all whom it may concern:*

Be it known that I, GEORGE G. McMURTRY, a resident of the borough of Manhattan, city, county, and State of New York, have invented certain new and useful Improvements in Steel-Making Processes, of which the following is a specification.

My invention aims to obtain from comparatively cheap materials a steel of the finest quality, or at least of a quality superior to that heretofore obtained from such materials. For this purpose I combine the basic process which is applicable to the refining of comparatively cheap iron and steel containing a considerable percentage of phosphorus, with the acid process which is known to produce a higher degree of refinement but which has heretofore been applied only to expensive iron and steel, low in phosphorus.

The basic process of making steel consists in having a molten blanket of basic slag over a molten bath of iron or impure steel. By the addition of oxids, such impurities as phosphorus are removed by first oxidizing the impurity and entraining it in the slag. This operation may be carried on in an open hearth furnace, or in an electric furnace. In the electric steel process, further refining may be performed by having over the molten bath of metal a molten basic slag free from oxids and having a strictly reducing condition. This makes possible the removal of sulfur as calcium sulfid and the reduction of oxids to metals which unite with the steel.

The acid process may likewise be conducted either in the open hearth furnace or in the electric furnace. It has certain advantages in that the slag in the acid process is of such a nature as to allow impurities to rise out of the steel by their buoyancy and become incorporated in the slag.

The relative advantages of the basic and acid processes have been long recognized, but hitherto it has been thought necessary to conduct the basic process in a basic lined furnace and the acid process in an acid lined furnace.

I purpose to combine the basic and acid processes and to use a furnace lining of a material which is neutral, or substantially so, to the different slags. Such a material, for example, is the oxid of zirconium known commercially as zirconia. This material has also the high refractoriness which is necessary to withstand the temperatures employed. This material may be used in the form of bricks laid up to constitute the lining or may be spread into place in plastic condition and shaped as desired.

In using an open hearth furnace, I proceed as follows:

In an open hearth furnace, lined with a neutral refractory material, such as zirconia, I place pig iron and scrap, or other metallic materials, with limestone and oxids, for instance, an oxid of iron, commercially called iron ore. The lime and ore form a slag which oxidizes and eliminates from the bath phosphorus, silicon, manganese, carbon, etc. This slag is removed from the metal, either by scraping off the slag or by tilting the furnace and allowing it to flow away, or by removing the molten metal from the furnace and replacing it in the furnace minus the slag covering. I then add a second slag, acid in character, consisting, for instance, of silica sand, and finish the operation in the usual manner of working the acid open hearth process.

In using an electric furnace, I proceed as follows:

I place in an electric furnace, which is lined with a neutral refractory material, such as zirconia, the metal to be treated. I provide a slag, consisting of lime and iron ore, by which various metalloids are eliminated. I then remove the slag in one of the ways mentioned in connection with the open hearth procedure. I then add a slag very basic in character, consisting usually of lime and fluorspar, but which may also contain a certain amount of silica. By means of a reducing agent, such as carbon, silicon, aluminum, etc., I reduce oxids from the slag and, at the same time, remove sulfur from the metallic bath, by treating it in the slag as calcium sulfid. The slag extracts a certain amount of sulfur from the bath, which forms calcium sulfid and which tends to return very readily into the bath. The powdered carbon or similar reducing agent thrown on the slag combines with the sulfur of the calcium sulfid therein and prevents its return to the bath. There is thus a continued extraction of sulfur from the bath, without the usual returning of the same, and consequently a desulfurization of the bath. I then remove this basic slag from the bath of molten metal and thus get rid of the sulfur, leaving in the bath any metals which may have been reduced from their oxids. I then add an acid slag, consisting for instance of silica sand, and proceed in the usual way to finish the refining according to the acid process, except that in this case the heat necessary is obtained from the electric arc instead of by the combustion of gases in the melting chamber of an open hearth furnace.

I find that the steel obtained by treating according to the basic process first and then according to the acid process is of a superior quality. The new process is cheaper than the old acid process, because in the acid process as formerly worked it was necessary to make the steel from costly materials of great purity, whereas by my combination process I start with cheaper materials and ultimately secure the advantage of the acid process in greater refinement than can be obtained by the basic process alone; at the same time effecting a great economy as compared with the treating of the materials in two separate furnaces.

What I claim is:

In the making of steel, the process which consists in treating it first with a basic slag and then with an acid slag in the same furnace having a lining of zirconia.

In witness whereof, I have hereunto signed my name in the presence of two subscribing witnesses.

GEORGE G. McMURTRY.

Witnesses:
D. ANTHONY USINA,
LULA STUBENVOLL.

Copies of this patent may be obtained for five cents each, by addressing the "Commissioner of Patents, Washington, D. C."